April 29, 1924.
H. C. REES
LENS MOUNTING ELEMENT
Filed Nov. 9, 1921
1,492,393
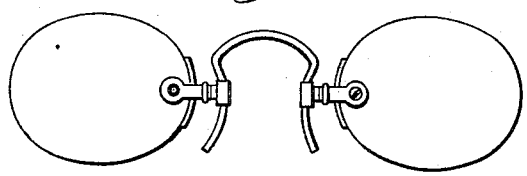
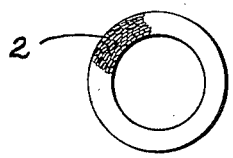
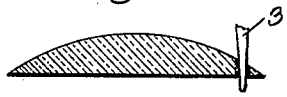
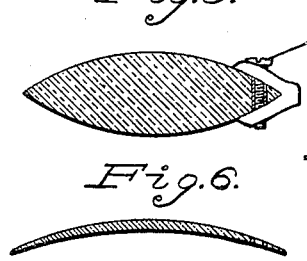
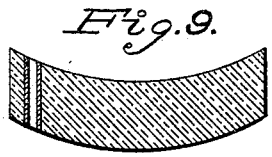
Inventor.
Herbert C. Rees.
By J. R. Amwail Atty.

Patented Apr. 29, 1924.

1,492,393

UNITED STATES PATENT OFFICE.

HERBERT C. REES, OF SAN ANTONIO, TEXAS.

LENS-MOUNTING ELEMENT.

Application filed November 9, 1921. Serial No. 513,874.

*To all whom it may concern:*

Be it known that I, HERBERT C. REES, a citizen of the United States, residing at San Antonio, county of Bexar, State of Texas, have invented a certain new and useful Improvement in Lens-Mounting Elements, of which the following is a full, clear, and exact description, such as will enable others skilled in the art to which it appertains to make and use the same, reference being had to the accompanying drawings, forming part of this application.

My invention relates particularly to the optical art and consists in a tube adapted to form bushings for use in the mounting of glass lenses in the frames of eye-glasses, spectacles, and the like.

In the mounting of such lenses, it is customary to secure the lens to the frame by means of screws inserted through holes drilled in the strap and lens, and by cooperating strap extensions which bear against the adjacent edge of the lens. The structure of glass is such that it is impossible to drill smooth, cylindrical holes in lenses and to thread these holes, consequently a mounting screw, which being smaller than its hole, can only contact at intervals with one lineal element of the hole surface and when there is relative angular movement of lens and screw, this dotted line contact with the side of the hole become a point contact at one end thereof. At best the lens is only gripped at three points, at the contact between the screw and lens and at the end of each strap extension. This mounting results in a concentrated application of any strain which is created between the lens and its mount, causing frequent breaking out of the end of the lens adjacent the screw hole.

To remedy this condition, opticians have resorted to the application of cements to the screw and hole, which has eliminated to a small extent the unequal distribution of the holding strains, but has been inconvenient and only partially successful.

Efforts have also been made to fill the hole with plugs of metal applied in molten condition, with bushings of rubber and metal and other substances inserted into the hole and having the holding jaws of the frame clamped over the ends thereof. None of these devices, to my knowledge, has been successful due to the difficulty of applying same to the lens and to the inability of the bushing to accurately fit the hole and to maintain its original condition. There is also difficulty experienced in applying the straps over the lenses when there is any projection by a bushing element beyond the face of the lens as the straps are nicely adjusted to barely slip over the lens and if space is provided for a protruding bushing it is at the cost of the desired contact of the lens with the full length of the strap jaws.

In Patent No. 1,375,108, issued to me April 19, 1921, I disclosed the process of making a tube which is especially adapted for forming the tube shown in the accompanying sheet of drawings, forming a part of this application and in which—

Figure 1 is a view of a pair of eye-glasses in which the lens is equipped with my invention.

Figure 2 is a detail view on an enlarged scale of the tube from which my lens bushing is cut.

Figure 3 is a transverse section of the tube drawn on a greatly enlarged scale.

Figures 4 to 9 inclusive are longitudinal sections through different types of lenses and serve to illustrate the varying conditions which must be accommodated by an element of the nature of my invention.

The tube 1 shown in Figure 2 and embodying a preferred form of my invention, is formed as described in the above-mentioned patent, by spirally winding a strip of material upon a mandrel, then compressing the tube formed both radially and axially and freeing it from excess moisture. The material used should possess the qualities of being easily expanded, either by physical or chemical means, and should be easily cut and threaded. The property of hardening or setting is also desirable.

I have found that material of cellular construction and possessing hygroscopic properties answers the above requirements and raw hide material is the best substance which I have experimented with, although parchment and animal intestinal walls are serviceable.

A long narrow strip of raw hide is easily formed into the tube shown in Figure 2, and its cells 2, when collapsed by the compression mentioned, readily take up moisture when exposed thereto and expand and, upon subsequent drying, the material in its expanded condition hardens to a remarkable degree. It is a substance which endures permanently without deterioration and is not subject to decomposition like rubber nor to tarnishing or corroding like metals.

Figures 4 to 9 clearly demonstrate the different types of lenses, each of which is made in varying thicknesses. To stock an assortment of bushings cut to length for every possible lens would be practically impossible, and at best the ends of such bushings could not be expected to accommodate the many variations in the contour of the lenses. To insert cut bushings into the lens either before or after the latter is assembled with the frame would be extremely difficult. By the use of my tubes these difficulties are overcome. When a lens is to be mounted, the tube 1 is inserted in the lens as indicated in Figure 7 and severed along the contact of each lens surface with the tube by a razor blade 5 or other sharp instrument. The ends of the bushing thus formed are flush with the surfaces of the lens throughout the circumference of each bushing end irrespective of the thickness and contour of the lens.

The bushing may be expanded by means of a tapered pin 3 as shown in Figure 4. When the screw 4 is inserted into the bushing, it will form threads in the bushing wall and be provided with a bearing throughout its surface and all the strain between the mount and the lens will be distributed over the full length and circumference of the opening in the lens. Upon being wet, the collapsed cells will swell and tightly fill every crevice between the screw threads and in the glass walls of the hole. Even if the bushing is not expanded physically nor intentionally wet, it will take up sufficient moisture from the air to expand the cells and completely fill the hole in the lens and tightly grip the holding screw. Eventually the bushing will harden and provide the screw with a holding surface which is rigid and practically integral with the lens. Accidents which will not shatter the glass, ordinarily will not cause fracture at the mount.

Eye-glasses equipped with my improved mounting element have been tested by the United States Bureau of Standards by relatively twisting and bending two lenses mounted in a frame and comparing the number of bends and twists prior to failure with the similar endurance of lenses provided with the usual mounts. These tests indicate that glasses with my mounting element will stand from three to four times as many distortions as glasses not so equipped. The advantage of this durability does not take into account the facility of assembly nor the permanence of the mounting which eliminates the "loose screw" nuisance with which all opticians and users of glasses are familiar.

My invention is not limited to the use of the materials mentioned, as other substances with which I am unfamiliar may be substituted for rawhide provided they possess the characteristics above set forth. It is not essential that the tubes be formed by spirally winding narrow strips of material. Tubular punchings, suitably united, and other forms of tube may be devised in its commercial development. Nor is the application of my invention limited to eye-glasses and spectacles as any connection between mounting elements and articles of glass or like substances may be improved by the use of my bushings. The attachment of the glass walls of showcases and the mounting of store windows are familiar examples. My invention may be embodied in any construction included within the spirit of the following claims.

I claim:

1. A tube consisting of a helix formed of a tape-like strip of rawhide, the coils of the tube being compressed together axially of the tube and the wall compressed radially of the tube.

2. A tube of small exterior diameter and thin walls formed of cellular material and compressed to collapse the cells transversely and longitudinally of the tube.

3. A rawhide tube formed of a thin relatively wide strip of material wound in a helix with the strip width disposed longitudinally of the helix axis, the wall of the tube being compressed uniformly along all of its radii.

4. A rawhide tube formed of a thin strip of material helically wound, the wall of which is compressed uniformly along all of its radii and in which the axially aligned contiguous edges of the strip are pressed together to form a continuous surface.

In testimony whereof I hereunto affix my signature this 3rd day of November, 1921.

HERBERT C. REES.